(No Model.)

W. E. PETTENGILL.
INSIDE CALIPERS.

No. 350,768. Patented Oct. 12, 1886.

Witnesses
S. N. Piper.
T. O. B. Torrey

Inventor.
Walter E. Pettengill.
by R. H. Eddy att'y.

UNITED STATES PATENT OFFICE.

WALTER EDWIN PETTENGILL, OF PETERBOROUGH, NEW HAMPSHIRE.

INSIDE CALIPER.

SPECIFICATION forming part of Letters Patent No. 350,768, dated October 12, 1886.

Application filed June 14, 1886. Serial No. 205,104. (No model.)

*To all whom it may concern:*

Be it known that I, WALTER EDWIN PETTENGILL, of Peterborough, in the county of Hillsborough, of the State of New Hampshire, have invented a new and useful Improvement in Calipers; and I do hereby declare the same to be described in the following specification, and represented in the accompanying drawings, of which—

Figure 1:
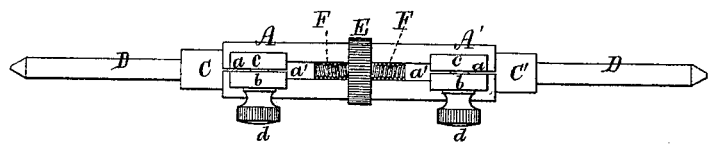
Figure 2:
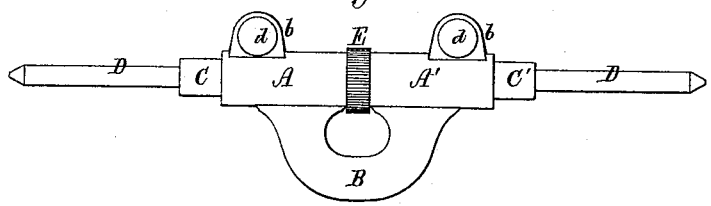
Figure 3:
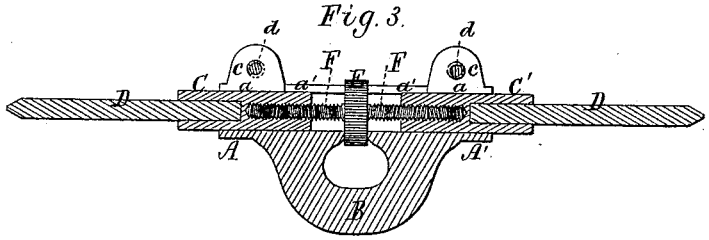
Figure 4:
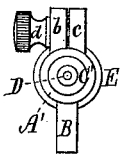

Figure 1 is a top view, Fig. 2 a side elevation, Fig. 3 a longitudinal section, and Fig. 4 an end view, of an instrument of my invention, the nature of which is defined in the claims hereinafter presented. It is for the purpose of determining the diameter or caliber of a tube, a round cavity, or the bore of a gun, for example.

In the drawings, A and A' denote two tubular clasps arranged end to end at a short distance apart and with their axes in one straight line. Each of such clasps consists of a tube slotted lengthwise, as represented at $a$ and $a'$, and provided with two ears extending up from it, as shown at $b$ and $c$. A clamp-screw, $d$, goes through one of such ears and screws into or through the other. The two clasps are connected by an arched handle, B. Within the bore of each of the clasps is one of two cylinders, C and C', each of which at its outer end is socketed to receive and hold firmly a short pointed rod, D, to extend from the cylinder in manner as represented. Between the next adjacent or inner ends of the two clasps there is a milled head or short cylinder, E, having a thickness about equal to the distance between such ends. Projecting in opposite directions from such milled head, and firmly fastened to it, are two screws, F, one of which is "right threaded" and the other "left threaded." They screw into the two cylinders C and C' endwise thereof. If desirable, each of such cylinders may be slitted or split lengthwise of it, so as to be contracted transversely upon its rod. By turning the milled head one way both cylinders may be simultaneously moved apart, or may be drawn toward each other by revolving the milled head the opposite way, after which they may be clamped in position by turning "hard up" the screws $d$ of the clasps A and A'.

To use the instrument, it is to be inserted within the bore or cavity whose caliber or diameter it may be desirous of obtaining, and the milled head is to be revolved until the points of the rods D may bring up against opposite parts of the said bore or cavity. This having been done, the clamp-screws $d$ are to be set up, so as to cause the two clamps to take firm hold of the two cylinders. The part $a'$ of each slot $a\ a'$ is of sufficient width to allow of the screw F being inserted through it into the clasp, otherwise the screws fastened to the milled head could not well be placed within the clasps.

Several sets of rods, of which those of one may differ in length relatively to those of another set, usually accompanying each instrument, they being for use as the diameter of a cavity to be calipered, or as occasion may require.

I claim—

1. The improved caliper, substantially as described, consisting of the two clasps A and A', their arched connection or handle B, two socketed cylinders, C and C', their pointed rods D and D', and the milled head E and its two screws F, all arranged and applied essentially as set forth.

2. The two clasps A and A', connected, arranged, slotted lengthwise, and provided with clamping-screws $d$, as set forth, in combination with the socketed cylinders C and C', and with the two reversed screws F and their operative head E, arranged with each other and such clasps, substantially as represented.

WALTER EDWIN PETTENGILL.

Witnesses:
R. H. EDDY,
R. B. TORREY.